US012775997B2

(12) United States Patent
Park et al.

(10) Patent No.: US 12,775,997 B2
(45) Date of Patent: Oct. 27, 2026

(54) APPARATUS FOR ADJUSTING SURROUND VIEW IMAGE

(71) Applicant: BLTECH CO., LTD., Bundang-gu (KR)

(72) Inventors: Cheol Jin Park, Hwaseong-si (KR); Jeong Yeol Bae, Jeju-si (KR)

(73) Assignee: BLTECH CO., LTD., Bundang-gu (KR)

( * ) Notice: Subject to any disclaimer, the term of this patent is extended or adjusted under 35 U.S.C. 154(b) by 182 days.

(21) Appl. No.: 18/961,620

(22) Filed: Nov. 27, 2024

(65) Prior Publication Data

US 2026/0134503 A1 May 14, 2026

(30) Foreign Application Priority Data

Nov. 8, 2024 (KR) ........................ 10-2024-0158042

(51) Int. Cl.
*G06T 7/80* (2017.01)
*G06T 3/047* (2024.01)
*G06T 5/80* (2024.01)

(52) U.S. Cl.
CPC ................ *G06T 3/047* (2024.01); *G06T 5/80* (2024.01); *G06T 7/80* (2017.01); *G06T 2207/10016* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 10,397,524 B1 | 8/2019 | Wu | |
| 10,475,154 B2 | 11/2019 | Husted et al. | |
| 10,652,466 B2 | 5/2020 | Guerreiro et al. | |
| 12,183,040 B2 | 12/2024 | Duan et al. | |
| 2017/0347030 A1* | 11/2017 | Guerreiro ................. | G06T 5/80 |
| 2019/0050959 A1 | 2/2019 | Husted et al. | |
| 2023/0032613 A1 | 2/2023 | Duan et al. | |

(Continued)

FOREIGN PATENT DOCUMENTS

| | | |
|---|---|---|
| KR | 10-2022-0061334 A | 5/2022 |
| KR | 102699876 B1 | 8/2024 |

OTHER PUBLICATIONS

International Search Report of PCT/KR2024/096479, mailed Jul. 25, 2025.

*Primary Examiner* — Joni Hsu
(74) *Attorney, Agent, or Firm* — DICKINSON WRIGHT PLLC

(57) ABSTRACT

Disclosed is a technology for generating k 3D target viewing coordinates with 3D coordinates using k target viewing distances and k target viewing heights, deriving k costs by calculating costs for the 3D target viewing coordinates, expanding a 2D region in at least one of a first direction and a second direction using the k cost values, changing a field-of-view off camera identification corresponding to a field-of-view deviation determination point out of a field of view to a set value, and when an i-th field-of-view off camera identification among k field-of-view off camera identifications has a set value and an i-th cost among k costs is equal to or less than an inside threshold, generating a new i-th target viewing distance and a new i-th target viewing height by reducing at least one of the i-th target viewing distance and the i-th target viewing height.

12 Claims, 11 Drawing Sheets

(56) References Cited

U.S. PATENT DOCUMENTS

| | | | | |
|---|---|---|---|---|
| 2023/0319218 A1* | 10/2023 | Ren | B60W 30/06 | |
| | | | 382/284 | |
| 2024/0312153 A1* | 9/2024 | Lee | G06T 17/00 | |

* cited by examiner

APPARATUS FOR ADJUSTING SURROUND VIEW IMAGE

CROSS-REFERENCE TO RELATED APPLICATIONS

This application claims priority to and the benefit of Korean Patent Application No. 10-2024-0158042, filed on Nov. 8, 2024, the disclosure of which is incorporated herein by reference in its entirety.

FIELD

The present disclosure relates to an apparatus for adjusting a surround view image, and more specifically, to an apparatus for adjusting a surround view image, which automatically adjusts an output range of a surround view image.

BACKGROUND

To ensure driver convenience and safe driving, vehicle manufacturers install rear cameras to allow drivers to see the rear of the vehicle when reversing.

Recently, a surround view system has been developed and is being used, where cameras are installed not only at the rear but also at the front, left, and right sides of the vehicle. This system allows a driver to check all directions—front, back, left, and right—not just while parking, but also while driving, thereby enabling safer and more convenient driving.

To generate such a surround view image, multiple cameras are mounted at fixed locations on the vehicle. Calibration is then performed to correct the installation of each camera, and the images from these cameras are combined to generate a surround view image that appears to have been captured by a single virtual camera.

This surround view image is provided to the driver of the vehicle, helping to improve the driver's field of view while driving.

However, when providing this surround-view video to the driver, the resolutions of the video output devices differ depending on the type of vehicle, and drivers have varying preferences for the field of view range.

Therefore, it is necessary to adjust the output of the surround view image according to the differences in resolution and drivers' preferences.

To adjust a surround view image, maintenance shops or manufacturers have staff manually adjust the mesh gradient of the image. As a result, a lot of time is spent on the adjustment of a surround view image, and due to the variation in adjustments made by different personnel, there is an issue with providing a uniform surround view image.

SUMMARY

The present disclosure aims to automatically adjust a surround view image according to set conditions.

In one aspect, there is provided an apparatus for adjusting a surround view image, and the apparatus includes: a storage unit configured to store a 2D region, k target viewing distances, k target viewing heights, and r field-of-view deviation determination points; and an image adjustment unit connected to the storage unit and configured to: generate k 3D target viewing coordinates by performing 3D coordinate conversion using the k target viewing distances and the k target viewing heights, respectively; derive k costs by calculating costs for the respective 3D target viewing coordinates; based on the values of the k costs produced, expanding the 2D region in at least one of a first direction and a second direction; determine whether each field-of-view deviation determination point positioned within a field of view of a real camera, and change a field-of-view off camera identification corresponding to any field-of-view deviation determination point out of the field of view among k field-of-view off camera identifications to a set value; and when an i-th field-of-view off camera identification among k field-of-view off camera identifications has a set value and an i-th cost among k costs is equal to or less than an inside threshold, generate a new i-th target viewing distance and a new i-th target viewing height by reducing at least one of an i-th target viewing distance and an i-th target viewing height by an adjustment amount.

The 2D region may include a minimum 2D region and a maximum 2D region, and the image adjustment unit may expand the minimum 2D region in at least one of the first direction and the second direction.

A range of expansion of the minimum 2D region is not greater than the maximum 2D region.

The image adjustment unit may convert the respective 3D target viewing coordinates into k 2D target viewing coordinates, and the cost may be a length of a 2D target viewing coordinate inward or outward from an edge of a display screen.

When a value of at least one cost related to the first direction among the k costs is all greater than the inside threshold, the 2D region may be expanded in the first direction so that a cost having a smaller value among the costs related to the first direction aligns with or is closest to a line defined by the inside threshold range, the line defined inward of the display screen. When a value of at least one cost related to the second direction among the k costs is all greater than the inside threshold, the 2D region may be expanded in the second direction so that a cost having a smaller value among the costs related to the second direction aligns with or is closest to a line defined by the inside threshold range, the line defined inward of the display screen. The inside threshold may be a cost of the inside threshold range.

When the i-th target viewing height is greater than a set amount, the image adjustment unit may reduce the i-th target viewing height by an adjustment amount, and when the i-th target viewing height is less than or equal to the set amount, the image adjustment unit may reduce the i-th target viewing distance by an adjustment amount.

The adjustment amount for adjusting the i-th target viewing height and the adjustment amount for adjusting the i-th target viewing length may be equal or different.

The r field-of-view deviation determination points may include four corners of the display screen, centers of sides of the display screen, and points where the straight line of a first direction and the straight line of a second direction, displayed on the display screen, meet the sides of the display screen.

The image adjustment unit may derive a minimum cost having a smallest value among the k costs, and when the i-th field-of-view off camera identification does not have a set value while the i-th cost exceeds an inside threshold, the image adjustment unit may increase or decrease a gradient of a mesh to which a 2D region extended in at least one of the first direction and the second direction is applied, using the minimum cost.

When the minimum cost is greater than the inside threshold, the image adjustment unit may decrease the gradient of the mesh.

When the minimum cost is not greater than the inside threshold and less than an outside threshold, the image adjustment unit may increase the gradient of the mesh.

The outside threshold may be a cost of an outside threshold range, and the outside threshold range may be a range surrounded by edges of the display screen.

DETAILED DESCRIPTION

Figure 1:
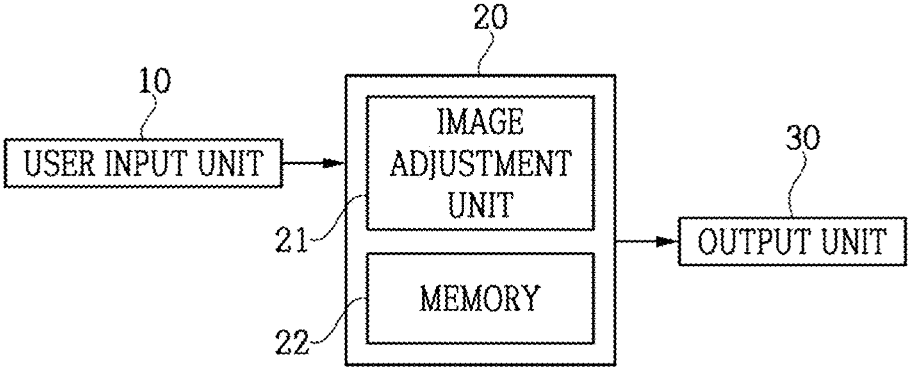
FIG. 1 is a schematic block diagram of a system for adjusting a surround view image according to one embodiment of the present disclosure.

Description will be given in detail according to exemplary embodiments disclosed herein, with reference to the accompanying drawings. For the sake of brief description with reference to the drawings, the same or equivalent components may be provided with the same or similar reference numbers, and description thereof will not be repeated. In addition, in the following description of the embodiments, a detailed description of known functions and configurations incorporated herein will be omitted when it may impede the understanding of the embodiments.

While terms including ordinal numbers, such as "first" and "second," etc., may be used to describe various components, such components are not limited by the above terms. These terms are used to distinguish one element from another.

As used herein, the singular forms "a", "an," and "the" are intended to include the plural forms as well, unless the context clearly indicates otherwise.

Each of the steps described above may be performed irrespective of the listed order, except when performed in the listed order due to a special causal relationship.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, an apparatus for adjusting a surround view image according to one embodiment of the present disclosure will be described with reference to the attached drawings.

In the present disclosure, a vehicle may have a plurality of real cameras, for example, first to fourth real cameras, and each camera may be attached at a designated location, for example, a front, rear, left, and right side of the vehicle. Therefore, each real camera may generate shooting data corresponding to a shooting action.

A virtual camera is a camera with the same structure as a real camera. In the present disclosure, it may be assumed that there is one virtual camera.

Additionally, in the present disclosure, virtual data may be video data based on a virtual camera as the underlying video data for generating a surround view video data of the present disclosure. This virtual data may be generated using corresponding shooting data generated from each real camera.

Accordingly, in the case of the present disclosure, since there are first to fourth real cameras mounted respectively on the front, rear, left, and right sides of a vehicle, there may be first to fourth virtual data. For example, the front virtual data, rear virtual data, left-side virtual data, and right-side virtual data may correspond to shooting data captured by the first to fourth real cameras. In other words, the front virtual data, rear virtual data, left-side virtual data, and right-side virtual data may correspond to front shooting data, rear shooting data, left-side shooting data, and right-side shooting data, respectively.

Accordingly, the surround view image data of the present disclosure may be full surround view image data generated using the front virtual data, the rear virtual data, the left-side virtual data, and the right-side virtual data.

The virtual camera is assumed to be mounted at a predetermined location above the vehicle (e.g., in the sky). In this case, the surround view image, captured when looking at the vehicle from the virtual camera at the predetermined location, may be a full surround view image, and the image data corresponding to this full surround view image may be full image data.

Therefore, a plurality of real cameras attached to the vehicle are intended to capture images to generate a full surround view image.

Each virtual data, shooting data, and entire image data may all have a plurality of pixels arranged in a matrix structure.

Hereinafter, a system for adjusting a surround view image according to the present disclosure will be described with reference to FIGS. 1 to 4. The system includes an apparatus 20 for adjusting a surround view image (hereinafter, referred to as an image adjustment apparatus 20) and adjusts a surround view image (i.e., the full surround view image).

As illustrated in FIG. 1, the system for adjusting a surround view image according to the present disclosure may include a user input unit 10, the image adjustment apparatus 20 connected to the user input unit 10, and an output unit 30 connected to the image adjustment apparatus 20.

The user input unit 10 is to enter input information for adjusting an output range of a surround view image.

The user input unit 10 may be electrically and physically connected to the image adjustment apparatus 20 using a connection cable or similar, and, if necessary, the connection may be disconnected.

Accordingly, various types of connection ports (not shown) for connecting cables may be provided in the user input unit 10 and the image adjustment apparatus 20.

In this way, when the user input unit 10 is connected to the image adjustment apparatus 20, a user (e.g., a driver and a mechanic) may enter input information for adjusting the output range of a surround view image through the user input unit 10.

Accordingly, the user input unit 10 may generate an electric signal corresponding to the input information and output the electric signal to the image adjustment apparatus 20.

For example, the input information may include a minimum and maximum two-dimensional (2D) area, a target viewing distance, and a target viewing height.

In the present disclosure, the 2D region may refer to an image of a floor surface where the vehicle 100 is positioned among the surround view images, and may be a region that is output to an image output device (not shown) of the vehicle 100 without distortion.

This 2D region may be designated as a region around the vehicle 100.

Figure 2:
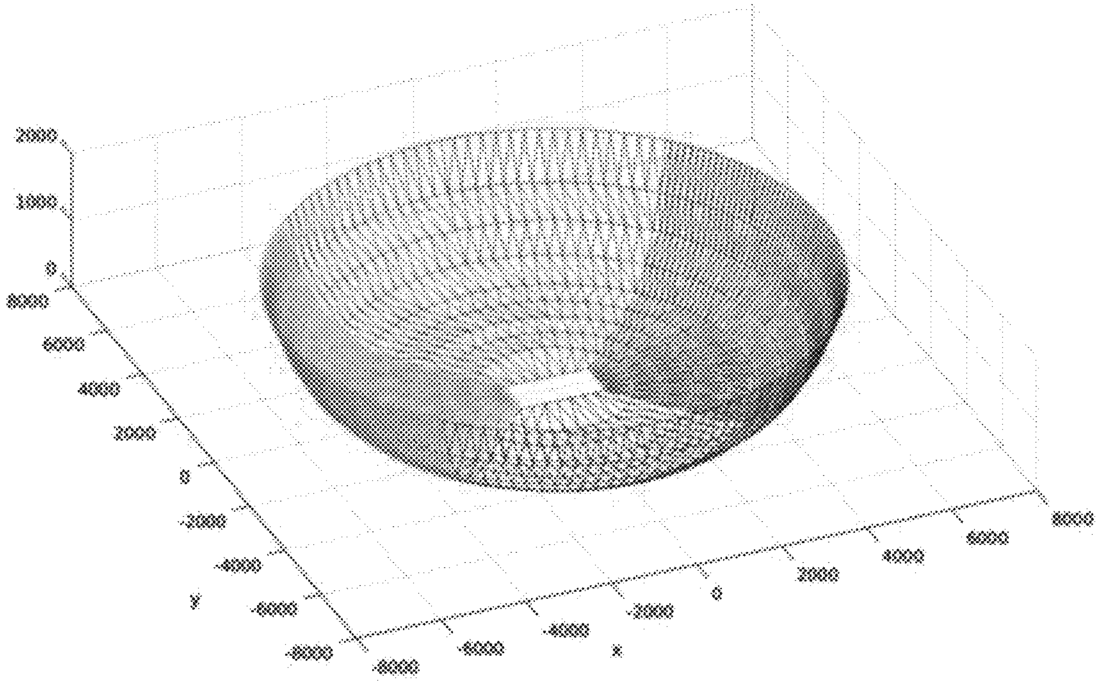
FIG. 2 is a diagram illustrating an example of a mesh for a surround view image.

For example, when a surround view image is generated, as shown in FIG. 2, using shooting data from real cameras (not shown) installed at the front, rear, left, and right sides of the vehicle 100, the surround view image may be represented as a mesh with multiple levels.

A region surrounded by the lowest levels among the multiple levels may be a region where an image of a floor surface without distortion, i.e., a surface in contact with the wheels of the vehicle 100, is displayed.

For the mesh formed of curves and points, a gradient of the mesh may refer to a gradient of the curves.

A 2D region may exhibit vertical and horizontal symmetry.

The minimum and maximum 2D regions in the present disclosure may represent the minimum and maximum areas of a 2D region desired by the user (e.g., the driver).

Figure 3:
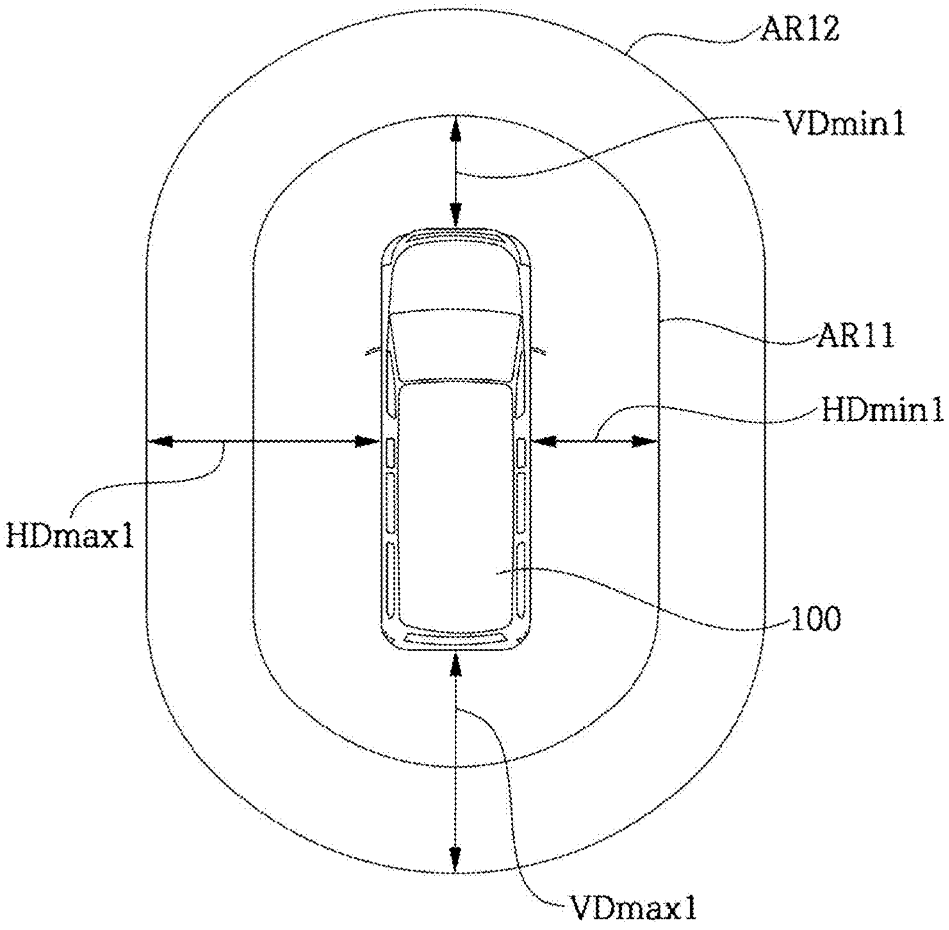
FIG. 3 is a diagram illustrating a minimum 2D region and a maximum 2D region in a system for adjusting a surround view image according to one embodiment of the present disclosure.

As illustrated in FIG. 3, a minimum 2D region AR11 may be determined by entering a front-to-back minimum distance VDmin1 and a left-to-right minimum distance HDmin1, and a maximum 2D region AR12 may be determined by entering a front-to-back maximum distance VDmax1 and a left-to-right maximum distance HDmax1.

Accordingly, the user may define the minimum 2D region AR11 by entering the front-to-back minimum distance VDmin1 and the left-to-right minimum distance HDmin1 through the user input unit 10, and may define the maximum 2D region AR12 by entering the front-to-back maximum distance VDmax1 and the left-to-right maximum distance HDmax1.

A target viewing distance may be a minimum distance of view that the driver wishes to be displayed on the image output device mounted inside the vehicle 100, and the target viewing height may be a minimum height of view that the driver wishes to be displayed on the image output device.

Figure 4:
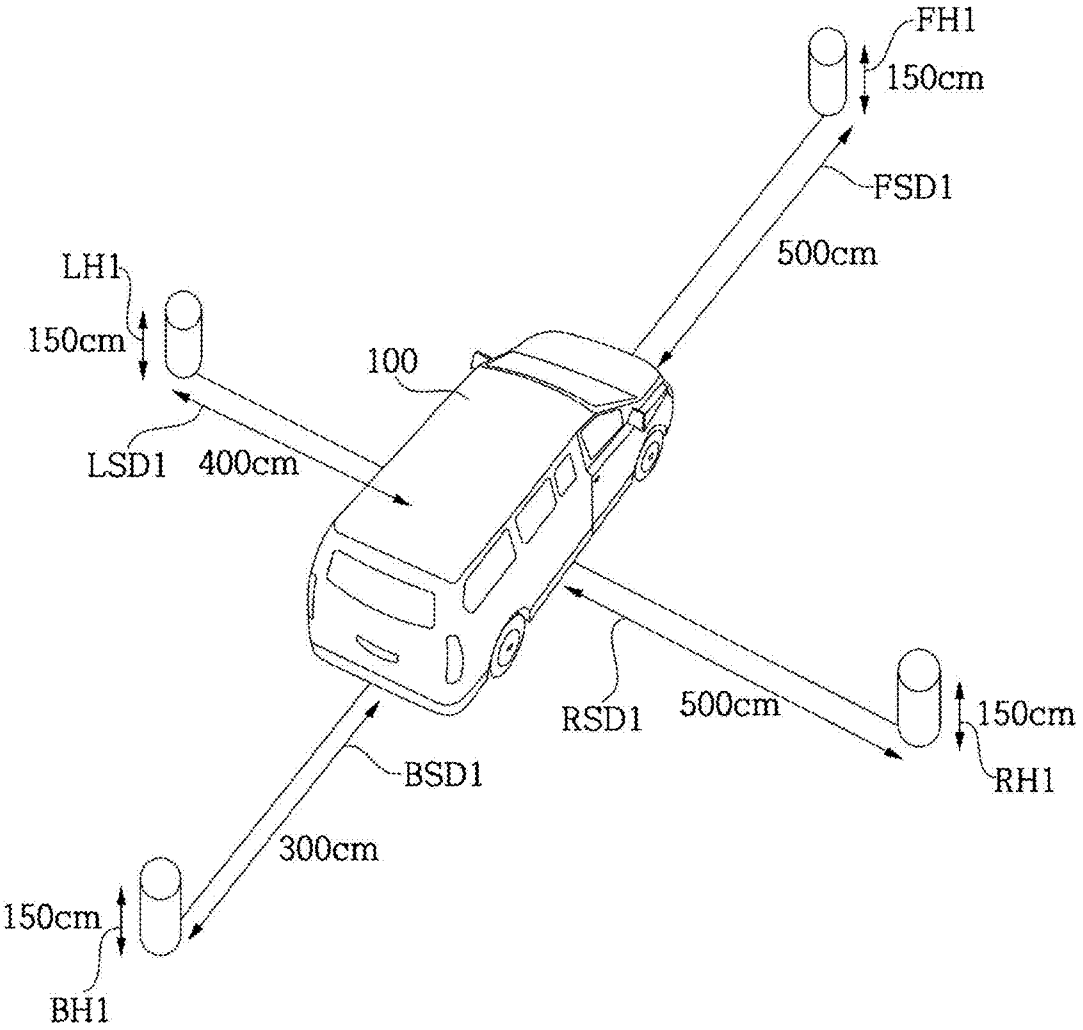
FIG. 4 is a diagram illustrating first to fourth target viewing distances and first to fourth target viewing heights in a system for adjusting a surround view image according to one embodiment of the present disclosure.

FIG. 4 illustrates an example of the target viewing distance and target viewing height.

Referring to FIG. 4, the target viewing distance and target viewing height may be the distance (e.g., 10 m) and height (e.g., 160 cm) from the front, rear, left, and right sides of the vehicle 100, respectively.

At this point, a front target viewing distance (a first target viewing distance) FSD1 and a back target viewing distance (a second target viewing distance) BSD1 (e.g., 10 m), which respectively represent the target viewing distances from the front and rear, may be equal to each other, and a left target viewing distance (a third target viewing distance) LSD1 and a right target viewing distance (a fourth target viewing distance) RSD1 (e.g., 5 m), which represent the target viewing distances from the left and right sides, may also be equal to each other.

Additionally, the target viewing heights at the front, rear, left, and right sides of the vehicle 100—namely the front target viewing height FH1, back target viewing height BH1, left target viewing height LH1, and right target viewing height RH1 (e.g., 160 cm)—may be all equal.

In this way, when the distances for the minimum and maximum 2D regions [e.g., the front-to-back minimum distance VDmin1 and front-to-back maximum distance VDmax1, and the left-to-right minimum distance HDmin1 and left-to-right maximum distance HDmax1] (hereinafter, the distances of the minimum and maximum 2D regions are referred to as "2D region distance ranges") are input to the user input unit 10 along with the target viewing distances and the target viewing heights, the user input unit 10 may transmit the input information to the image adjustment apparatus 20.

In this specification, the target viewing distances and target viewing heights may be target viewing information. The target field of view information (e.g., the first to fourth target field of view information) may be a plurality (e.g., four). Therefore, the first to fourth target field-of-view information may respectively include the first to fourth target viewing distances and the first to fourth target viewing heights.

Accordingly, the image adjustment apparatus 20 may adjust a surround view image so that a surround view image corresponding to a target viewing distance and target viewing height desired by the driver may be output to the image output device.

The image adjustment apparatus 20 may include an image adjustment unit 21 connected to the user input unit 10, and a memory 22 connected to the image adjustment unit 21.

The image adjustment unit 21 controls the overall operation of the image adjustment apparatus 20 and may be a processor.

When a 2D region distance range and target viewing information are input, the image adjustment unit 21 may perform a control operation to output a surround view image that matches the 2D region distance range and target viewing information.

The memory 22 may be a storage unit that stores data required for the operation of the image adjustment apparatus 20 and data generated during such an operation.

The memory 22 may be at least one of the following: a flash memory, a hard disk, a multimedia card micro, a card-type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The output unit 30 may operate under the control of the image adjustment unit 21 to generate output related to at least one of visual and auditory senses.

This output unit 30 may include a display module and an audio output module.

The display module displays an image corresponding to image data output from the image adjustment unit 21 on a display screen, based on the operation of the image adjustment unit 21.

The display module includes at least one display device among a liquid crystal display, an organic light emitting diode display, a flexible display, and a 3D display.

The audio output module may output an audio signal output from the image adjustment unit 21 as a voice, based on the operation of the image adjustment unit 21.

Next, with reference to FIGS. 5 to 12, the operation of a system for adjusting a surround view image having such a structure will be described.

First, when the operation of the system for adjusting a surround view image begins, a user, such as a driver or a mechanic, may input minimum and maximum 2D regions and target viewing information through the user input unit 10 to adjust a surround view image.

Figure 13:
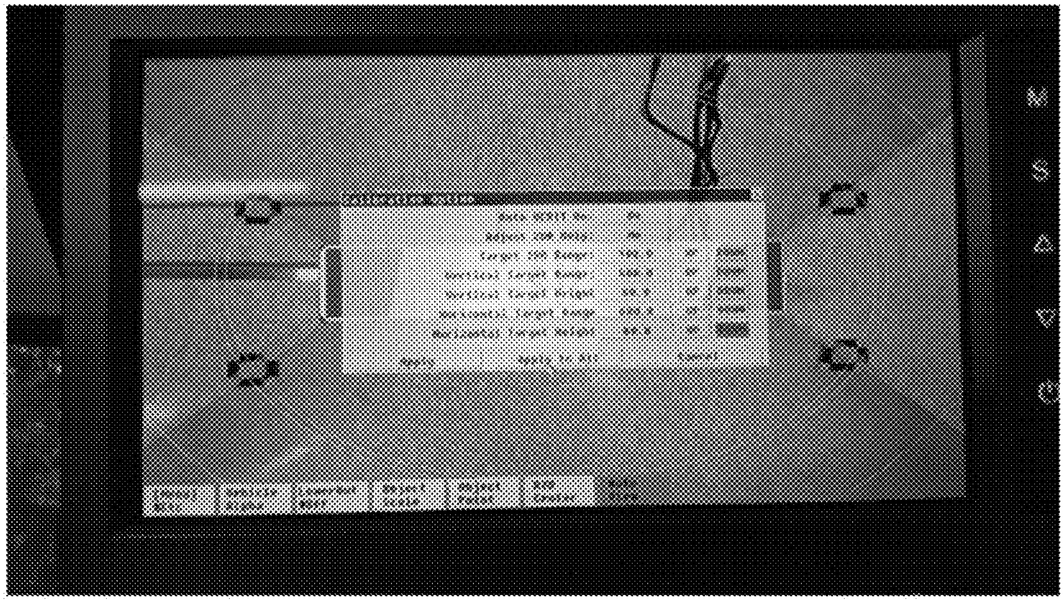
FIG. 13 is an example of a screen output to an output unit to input information for minimum and maximum 2D regions and a target viewing distance and a target viewing height in a system for adjusting a surround view image according to one embodiment of the present disclosure.

In the present disclosure, for inputting the minimum and maximum 2D regions and target viewing information (e.g., a target viewing distance and a target viewing height), the image adjustment unit 21 may display a user interface (UI) through the output unit 30, allowing the user to input the minimum and maximum 2D regions and target viewing information through the user input unit 10 (see FIG. 13).

For the minimum 2D region AR11, the front-to-back minimum distance VDmin1 and the left-to-right minimum distance HDmin1 may be input, and for the maximum 2D region AR12, the front-to-back maximum distance VDmax1 and the left-to-right maximum distance HDmax1 may be input.

When the minimum and maximum 2D region and target viewing information are input through the user input unit 10, the image adjustment unit 21 may store the input minimum and maximum 2D region and target viewing information in the memory 22.

Then, the image adjustment unit 21 may adjust a display status of a current surround view image so that the surround view image (e.g., a target surround view image) corresponding to the minimum and maximum 2D region and target viewing information can be displayed on the image output device of the vehicle 100.

Hereinafter, the operation of the image adjustment unit 21 will be described in detail with reference to FIGS. 9 to 12.

First, when the operation starts, the image adjustment unit 21 may store information for the minimum and maximum 2D regions, input through the user input unit 10, and front, back, left, and right target viewing distances (i.e., first to fourth target viewing distances) and target viewing heights (i.e., first to fourth target viewing heights) in the memory 22 (S1).

As described above, the information for the minimum 2D region AR11 may be a front-to-back minimum distance VDmin1 and a left-to-right minimum distance HDmin1, and the information for the maximum 2D region AR12 may be a front-to-back maximum distance VDmax1 and the left-to-right maximum distance HDmax1.

When the information for the minimum and maximum 2D regions is input through the user input unit 10, the image adjustment unit 21 may use the input information to determine the minimum 2D region and the maximum 2D region and store the determined minimum 2D region and the determined maximum 2D region in the memory 22.

Next, the image adjustment unit 21 may performs variable initialization (S2) to set variables necessary for the operation of the image adjustment unit 21 to initial values and store the initialized variables in the memory 22. For example, the variables may include a plurality of parameters for determining a gradient of a mesh for a surround view image and field-of-view off camera identifications.

Then, the image adjustment unit 21 may set the minimum 2D region AR11 stored in the memory 22 as an initial 2D region and store the same in the memory 22 (S3).

In addition, the image adjustment unit 21 may set variables necessary for the operation of the image adjustment unit 21, such as values of a plurality of parameters for determining a gradient of a mesh for a surround view image and field-of-view off camera identifications, to initial values and store the same in the memory 22.

Then, the image adjustment unit 21 may convert the target viewing information into three-dimensional (3D) coordinates, using the target viewing distance and target viewing height which are input through the user input unit 10 and stored in the memory 22 (S4).

Accordingly, through the conversion of the target viewing information into the three-dimensional coordinates, a plurality (e.g., k number, k=1, 2, 3, 4) of 3D target viewing coordinates (e.g., first to fourth 3D target viewing coordinates) may be generated, which respectively represent the target viewing coordinates (e.g., the X-axis, Y-axis, and Z-axis values) for each direction (e.g., front, rear, left, and right) of the vehicle 100.

Accordingly, the first to fourth 3D target viewing coordinates may include a first 3D target viewing coordinate (e.g., a front 3D target viewing coordinate) [target_3*d*(1)], a second 3D target viewing coordinate (e.g., a back 3D target viewing coordinate) [target_3*d*(2)], a third 3D target viewing coordinate (a left 3D target viewing coordinate) [target_3*d*(3)], and a fourth 3D target viewing coordinate (a right 3D target viewing coordinate) [target_3*d*(4)].

When the plurality of 3D target viewing coordinates [target_3*d*(1)~target_3*d*(4)] are generated, the image adjustment unit 21 may store the generated 3D target viewing coordinates [target_3*d*(1)~target_3*d*(4)] in the memory 22.

Figure 5:
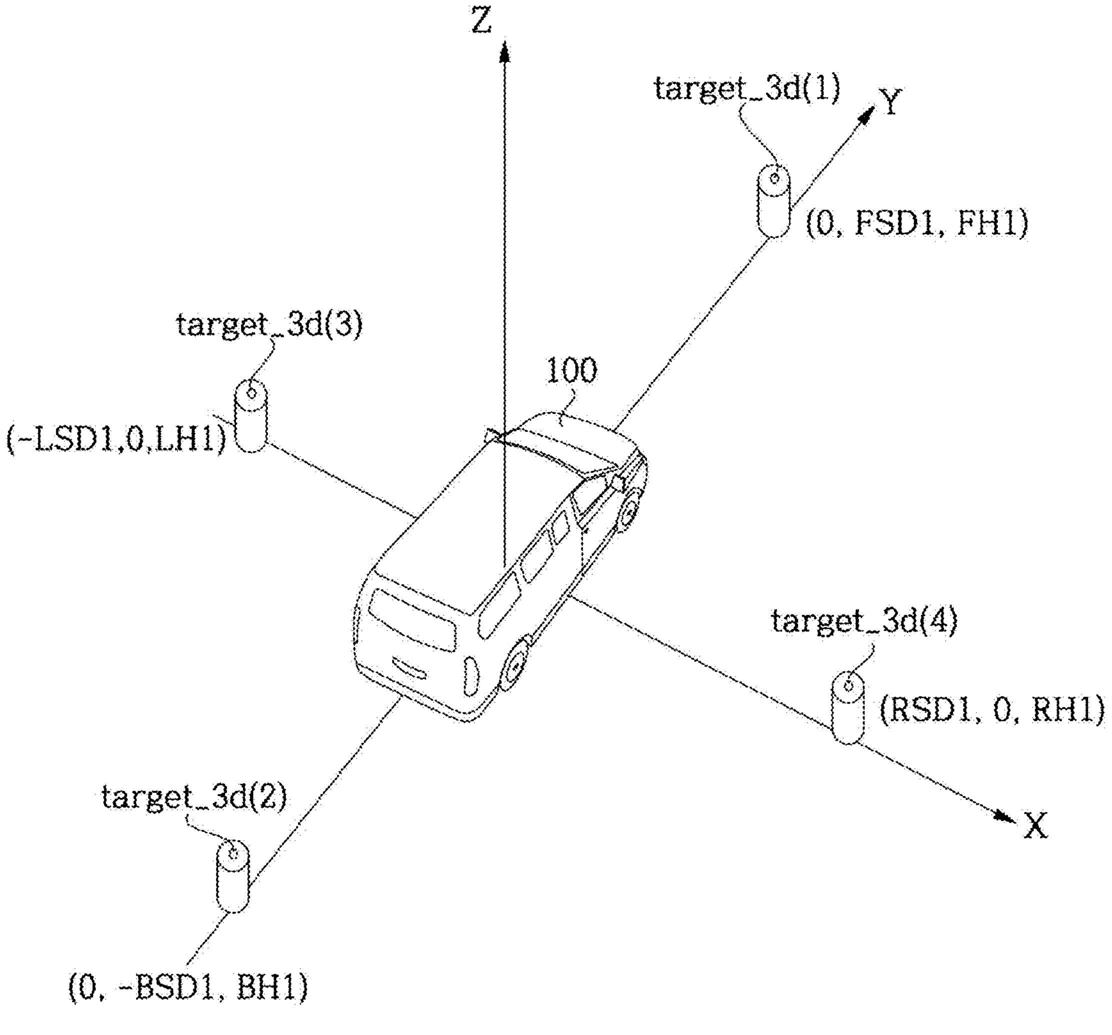
FIG. 5 is a diagram illustrating an example of first to fourth three-dimensional (3D) target viewing coordinates, which are generated using the first to fourth target viewing distances and first to fourth target viewing heights of FIG. 4.

As illustrated in FIG. 5, examples of the 3D target viewing coordinates [target_3*d*(1)~target_3*d*(4)] may be presented in the form of (a left or right target viewing distance, a front or back target viewing distance, a target viewing height). However, the positions of the X-axis, Y-axis, and Z-axis for each 3D target viewing coordinate [target_3*d*(1)~target_3*d*(4)] and the type of each coordinate are not limited thereto and may be changed.

Each of the left, right, front, and back target viewing distances may have a designated sign [e.g., (+) or (−)] depending on the direction thereof.

For example, the front target viewing distance may have a (+) value, while the back target viewing distance may have a (−) value. The left target viewing distance may have a (−) value, while the right target viewing distance may have a (+) value.

Therefore, as illustrated in FIG. 5, the front 3D target viewing coordinate [target_3*d*(1)] may be presented as (0, front target viewing distance, front target viewing height), the back 3D target viewing coordinate [target_3*d*(2)] may be presented as (0, −(back target viewing distance), back target viewing height), the left 3D target viewing coordinate [target_3*d*(3)] may be presented as (−(left target viewing distance), 0, left target viewing height), and the right 3D target viewing coordinate [target_3*d*(4)] may be presented as (right target viewing distance, 0, right target viewing height).

In addition, the image adjustment unit 21 may determine a point on a display screen SC1 of the image output device to determine whether image data of a surround view image to be finally output on the display screen of the image output device attached to the vehicle 100 is out of the field of view FOV of a real camera attached to the vehicle 100, i.e., whether the real camera has deviated from the field of view (S5).

At this point, the display screen SC1 of the image output device may have a plurality of pixels arranged in rows x and columns y. Therefore, the point on the display screen SC1 used to determine deviation from the field of view (e.g., a field-of-view deviation determination point) may have a corresponding coordinate (xn, ym).

Figure 6:
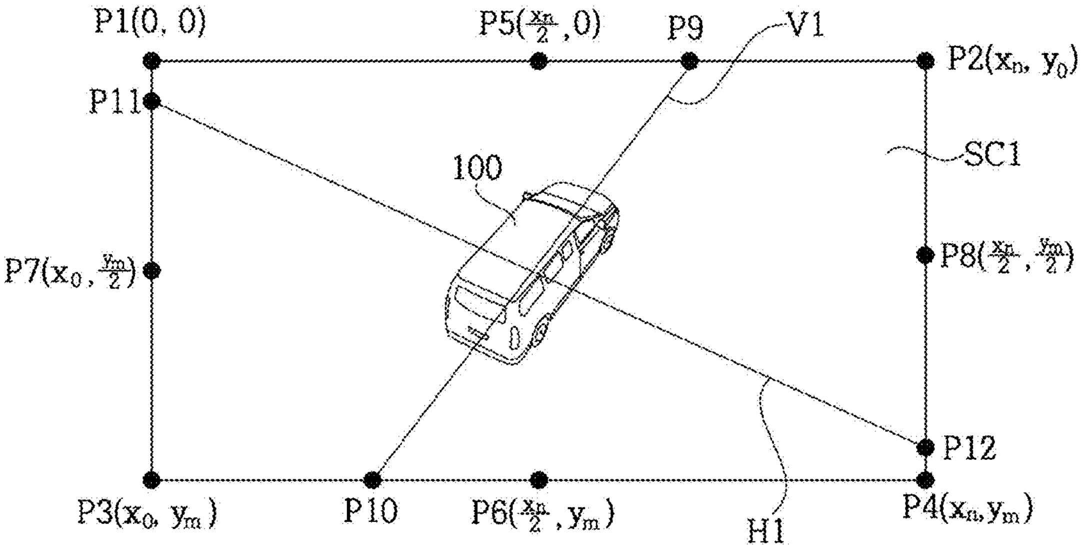
FIG. 6 is a diagram illustrating an example of a field-of-view deviation determination point in a system for adjusting a surround view image according to one embodiment of the present disclosure.

For example, the number of field-of-view deviation determination points may be in plural (e.g., r), as illustrated in FIG. 6. For example, there may be a total of 12 field-of-view deviation determination points (where r=1, 2, 3, . . . , 12) P1 to P12.

For example, these field-of-view deviation determination points P1 to P12 may include four corners P1 to P4 of the display screen SC1, the centers P5 to P8 of the sides of the display screen SC1, and the points P9 to P12 where a straight line V1 of a first direction and a straight line H1 of a second direction displayed on the display screen SC1 meet the sides of the display screen SC1. Here, the straight line V1 of the first direction may be a straight line extending along the first direction and passing through the center of the width of the vehicle, and the straight line H1 of the second direction may be a straight line extending along the second direction and passing through the center of the length of the vehicle.

At least one of the number and positions of these field-of-view deviation determination points P1 to P12 may be changed as needed.

Next, the image adjustment unit 21 may convert the first to fourth 3D target viewing coordinates [target_3*d*(1)~target_3*d*(4)], which are coordinates converted into 3D coordinates, into the first to fourth two-dimensional (2D) target viewing coordinates [target_2*d*(1)~target_2*d*(4)] which are 2D screen coordinates (S6). Here, the screen coordinates may be coordinates of 2D virtual data acquired by a virtual camera.

The 3D target viewing coordinates [target_3*d*(1)~target_3*d*(4)] are coordinates converted into 3D coordinates based on the world coordinate system.

An example of converting the 3D target viewing coordinates [target_3*d*(1)~target_3*d*(4)] into pixel coordinates of virtual data, which are 2D coordinates, is as follows.

First, the coordinate of the point where the straight line connecting the focus of the virtual camera and the respective 3D target viewing coordinates [target_3*d*(1)~target_3*d*(4)] intersect the mesh may be obtained. The obtained coordinate may be then converted into the virtual camera's 3D Cartesian coordinate system and subsequently converted into the virtual camera's spherical coordinate system.

Then, the coordinates converted into the virtual camera's spherical coordinate system may be converted into the coordinate of a point to be projected back into the virtual data's coordinate system, that is, the 2D coordinates of the X-axis and Y-axis (e.g., the coordinates of the 2D virtual data), which are the 2D target viewing coordinates [target_2*d*(1)~target_2*d*(4)]. This conversion of the coordinate systems is already well known, so a detailed description thereof is omitted.

Through this operation, when the respective 3D target viewing coordinates [target_3*d*(1)~target_3*d*(4)] are converted into 2D target viewing coordinates [target_2*d*(1)~target_2*d*(4)], the image adjustment unit 21 may store the coordinate values (xn, ym) of the converted 2D target viewing coordinates [target_2*d*(1)~target_2*d*(4)] in the memory 22 to correspond to the coordinate values (Xa, Yb, Zc) of the respective 3D target viewing coordinates [target_3*d*(1)~target_3*d*(4)] (S6).

Figure 7:
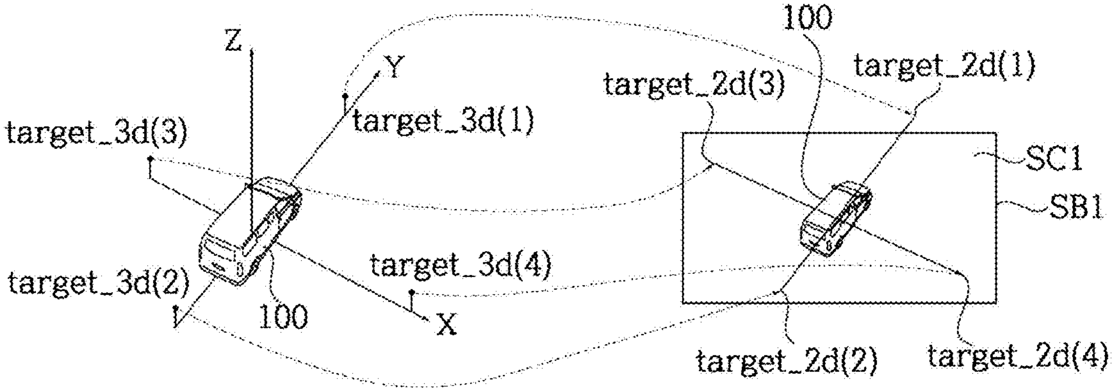
FIG. 7 is a diagram illustrating an example of converting first to fourth 3D target viewing coordinates into first to fourth two-dimensional (2D) target viewing coordinates in a system for adjusting a surround view image according to one embodiment of the present disclosure.

Therefore, referring to FIG. 7, the respective 3D target viewing coordinates [target_3*d*(1)~target_3*d*(4)] may correspond to the converted 2D target viewing coordinates [target_2*d*(1)~target_2*d*(4)]. In FIG. 7, it may be seen that one of the converted 2D target coordinates [target_2*d*(1)] is outside the display screen SC1.

Next, the image adjustment unit 21 calculates the cost [cost(1)~cost(4)] of the respective 2D target coordinates [target_2*d*(1)~target_2*d*(4)], and may derive a minimum cost, which is a smallest value among the calculated costs (S7).

The costs for the 2D target coordinates [target_2*d*(1)~target_2*d*(4)] [cost(1)~cost(4)] may be multiple values (e.g., k), so that the first to fourth costs [cost(1)~cost(4)] may be provided.

At this point, a cost may be a length (e.g., number of pixels) by which a corresponding 2D target coordinate [target_2*d*(1)~target_2*d*(4)] has deviated inwardly or outwardly from an edge SB 1 of the display screen SC1 of the image output device.

The length of deviation of the corresponding 2D target coordinate [target_2*d*(1)~target_2*d*(4)] may be a distance from the corresponding 2D target coordinate [target_2*d*(1)~target_2*d*(4)] to the nearest edge SB1.

If the corresponding 2D target coordinates [target_2*d*(1)~target_2*d*(4)] is positioned at the edge SB 1 of the display screen SC1, the cost for the corresponding 2D target coordinates may be '0'.

In addition, the cost may have a sign [positive (+) or negative (−)] depending on whether a corresponding one of the 2D target coordinates [target_2*d*(1)~target_2*d*(4)] is positioned inside or outside the edge SB 1 of the display screen SC1.

Figure 8:
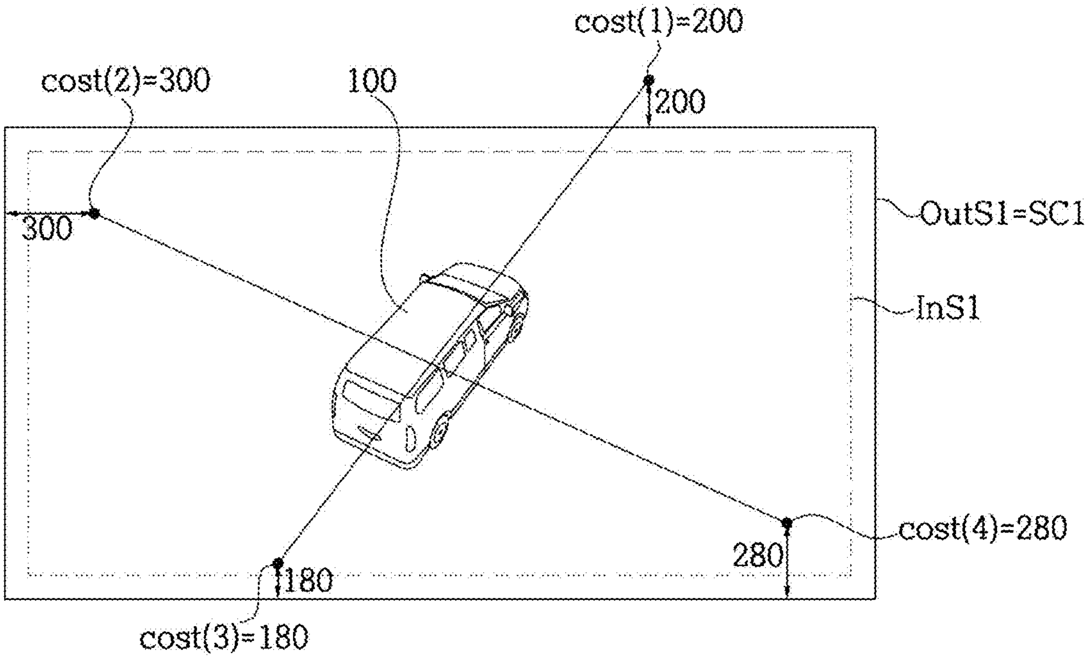
FIG. 8 is a diagram for explaining costs of first to fourth 2D target viewing coordinates and values of the costs in a system for adjusting a surround view image according to one embodiment of the present disclosure.
Figure 9:
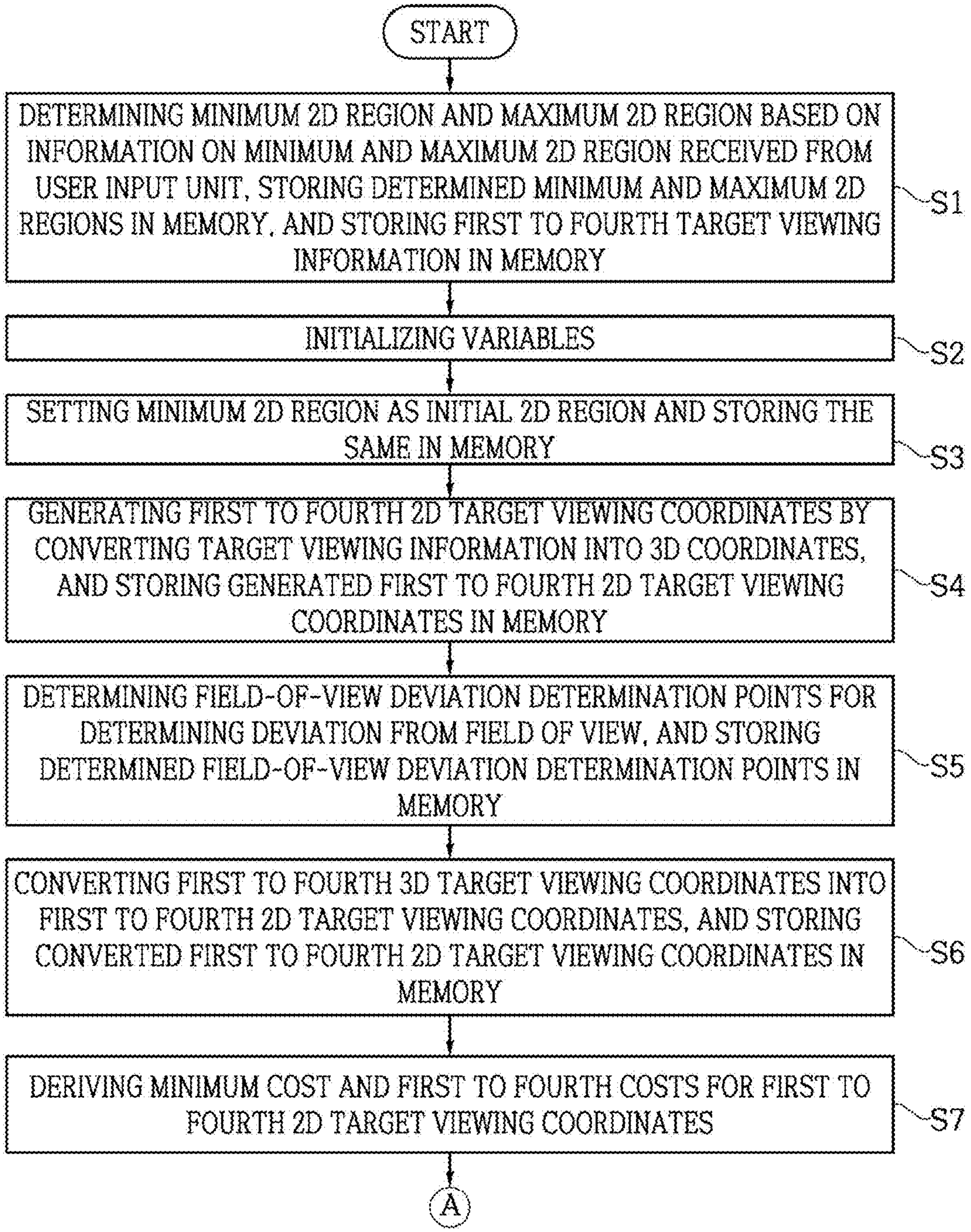
FIGS. 9 to 12 are each an operation flow diagram of a system for adjusting a surround view image according to one embodiment of the present disclosure.
Figure 10:
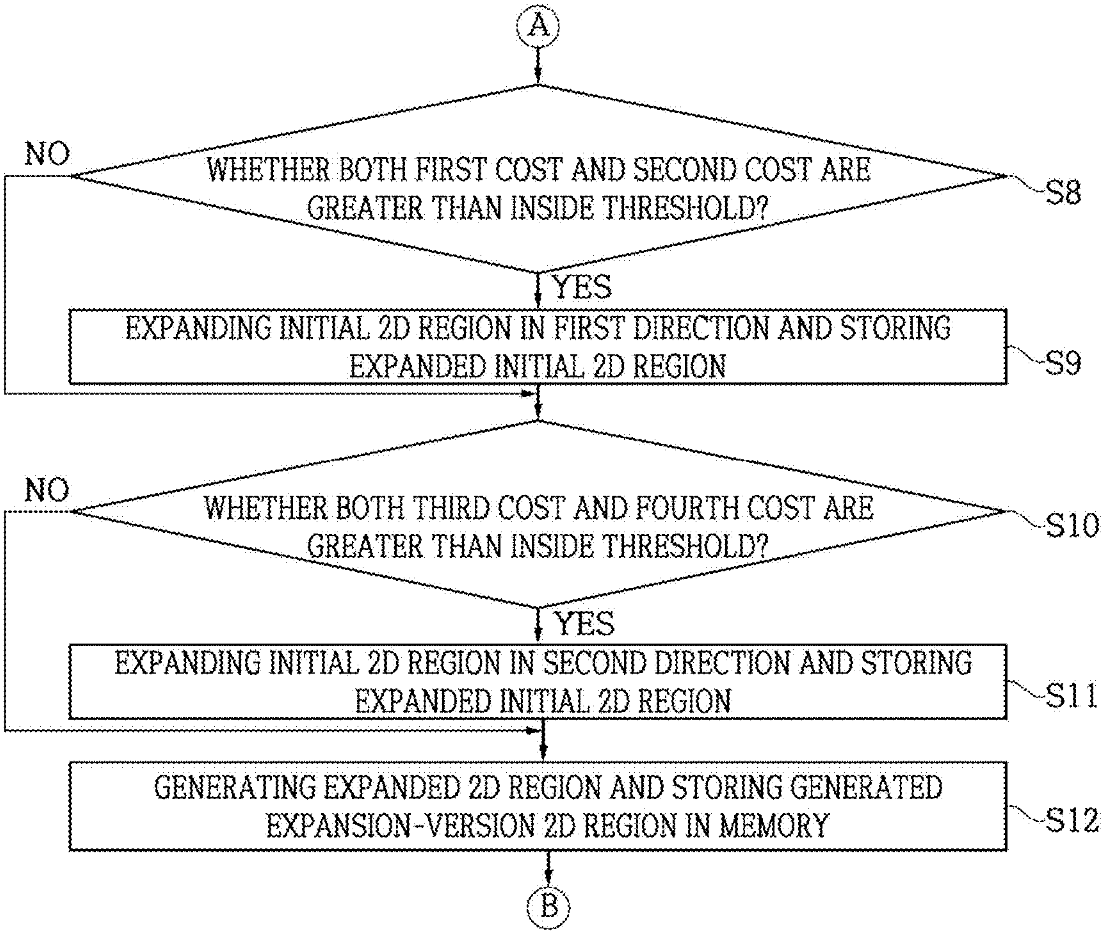
Figure 11:
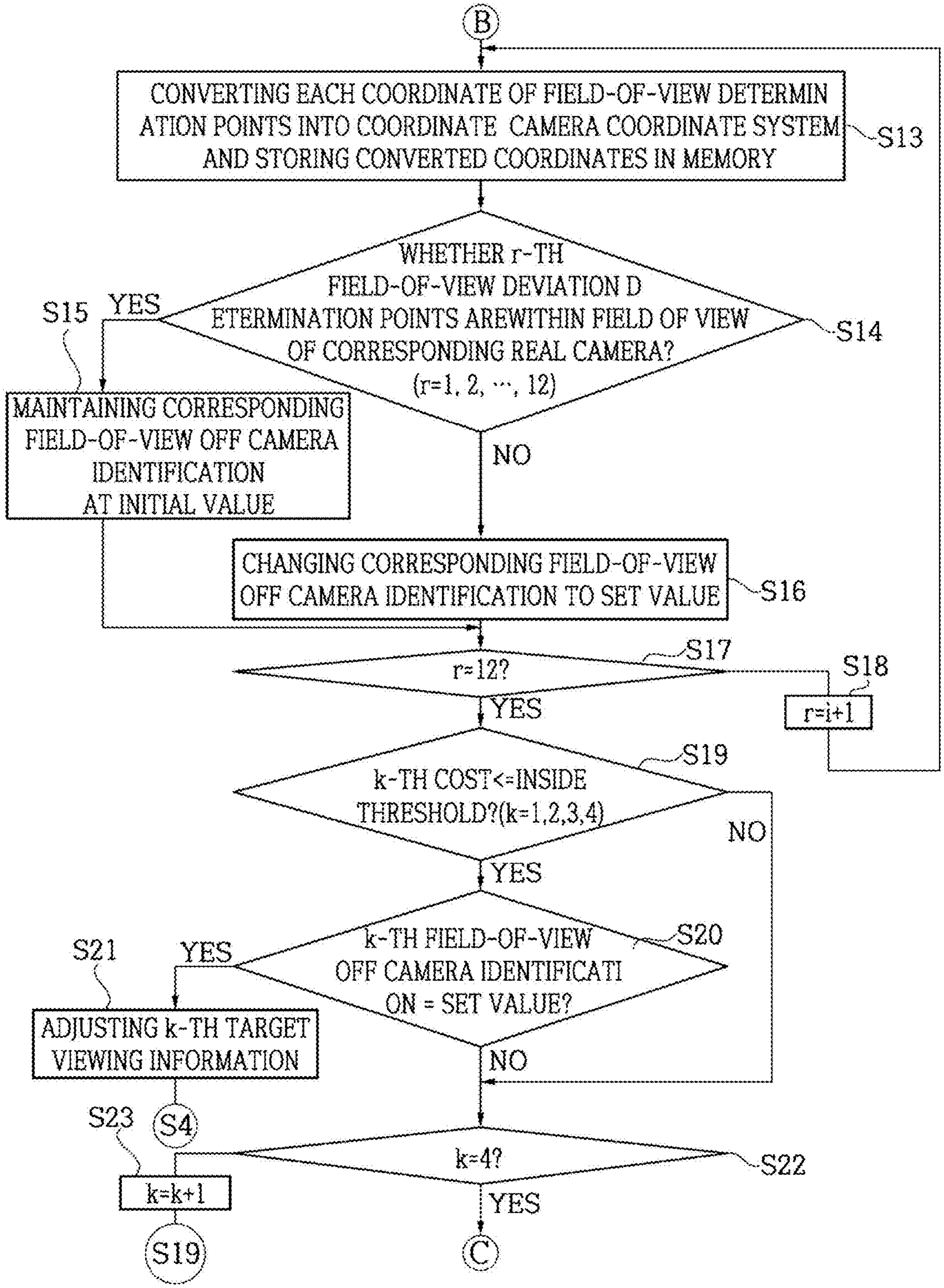
Figure 12:
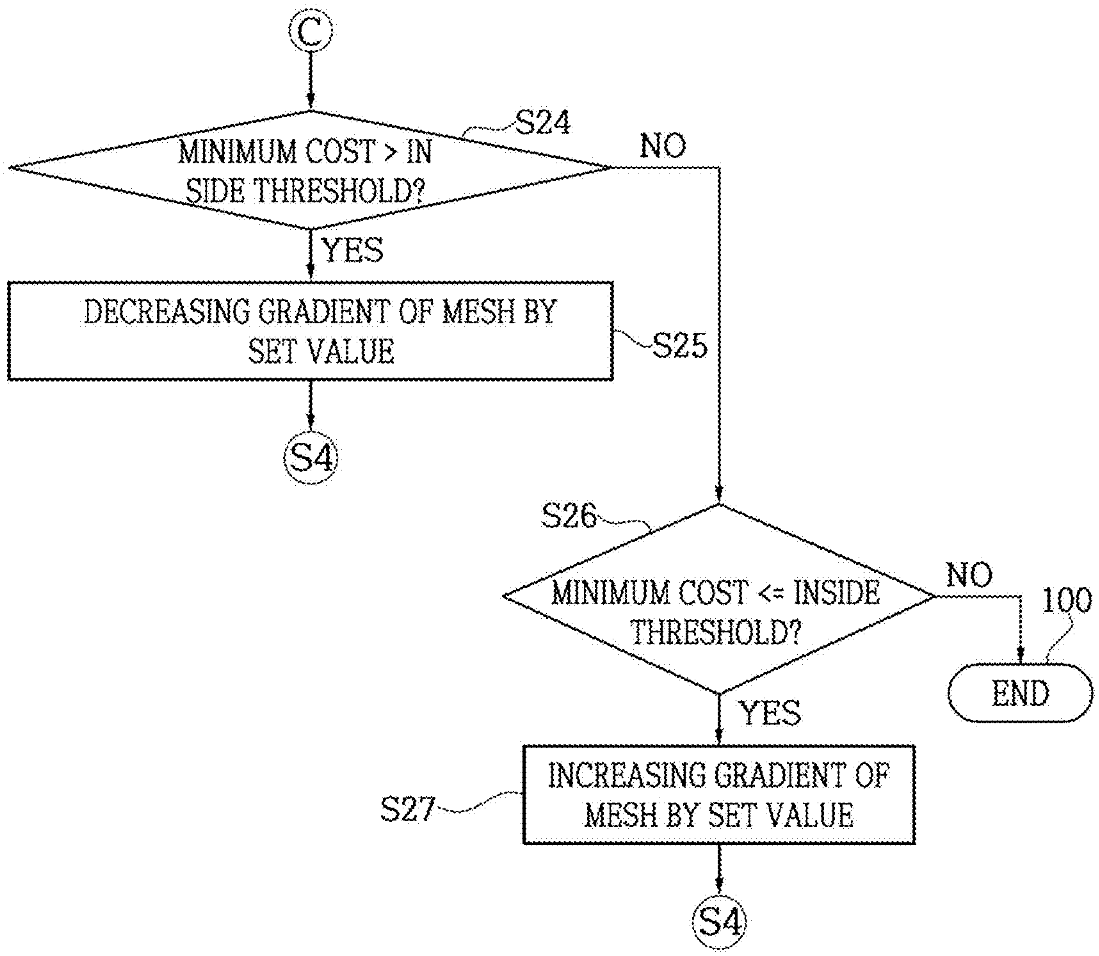

Thus, as shown in FIG. 8, the costs (e.g., first to fourth costs, or a front 2D target coordinate cost, a back 2D target coordinate cost, a left 2D target coordinate cost, and a right 2D target coordinate cost) [cost(1), cost(2), cost(3), cost(4)] for the four 2D target coordinates (e.g., the first to fourth 2D target coordinates, or the front two-dimensional target coordinate [target_2*d*(1)], the rear two-dimensional target coordinate [target_2*d*(2)], the left two-dimensional target coordinate [target_2*d*(3)], and the right two-dimensional target coordinate [target_2*d*(1)] may be, for example, −200, 300, 180, and 280, respectively.

Also, among the costs [cost(1), cost(2), cost(3), cost(4)] (which are −200, 300, 180, and 280, respectively), the smallest value may be −200, and in this case, a minimum cost may be −200 which corresponds to the cost for the first 2D target coordinates [target_2*d*(1)].

As such, when the costs [cost(1)~cost(4)] and the minimum cost for the first to fourth 2D target coordinates [target_2*d*(1)~target_2*d*(4)] are determined, the image adjustment unit 21 may adjust an initial 2D region, which is defined as the minimum 2D region AR11, using the costs

[cost(1)~cost(4)] and the minimum cost for the 2D target coordinates [target_2*d*(1)~target_2*d*(4)].

By this adjustment, a final 2D region may have a size appropriate for the target viewing information (e.g., a target viewing distance and a target viewing height).

To this end, the image adjustment unit 21 may determine whether the first and second costs [cost (1)] and [cost (2)], related to the front and rear in a longitudinal direction, i.e., the first direction, of the vehicle 100, are both greater than a corresponding set value (e.g., an inside threshold) (S8). That is, the image adjustment unit 21 may determine whether the first cost [cost(1)] and the second cost [cost(2)], related to the front and rear 2D target coordinates [target_2*d* (1), target_2*d*(2)] of the vehicle 100, are within an inside threshold range InS1 (see FIG. 8), which uses the inside threshold as a cost (S8).

As illustrated in FIG. 8, the inside threshold range InS1 may be a region positioned inwardly from the edge SB 1 of the display screen SC1. The inside threshold range InS1 may be determined by moving inward by a set number of pixels (e.g., 4) from the edge SB 1 of the display screen SC1.

The edge SB 1 of the display screen SC1 may define an outside threshold range OutS1, so the outside threshold range OutS1 may be a range surrounded by the edge SB 1 of the display screen SC1. Therefore, the cost of the outside threshold range OutS1 [e.g., the outside threshold] may be less than the inside threshold and may be '0'.

Accordingly, if both the front cost [cost(1)] and the back cost [cost(2)] are within the inside threshold range InS1, the image adjustment unit 21 may expand an initial 2D region in the first direction so that the cost adjacent to the inside threshold range InS1—either the front cost [cost(1)] or the back cost [cost(2)]—aligns with or is closest to a line defined by the inside threshold range InS1, thereby expanding the initial 2D region forward and backward along the first direction. That is, the length of the initial 2D region (e.g., number of pixels) is adjusted so that the initial 2D region expands in the first direction (S9).

This allows the initial 2D region to expand to the same size both forward and backward.

A range of expansion in the first direction may be adjusted so as not to exceed the front-to-back maximum distance HVmax1 of the maximum 2D region AR12 (see FIG. 3).

Similarly, by determining whether the third cost and the fourth cost, which are the left cost [cost(3)] and the right cost [cost(4)], are greater than the inside threshold, the image adjustment unit 21 may determine whether the left cost [cost(3)] and the right cost [cost(4)] are within the inside threshold range InS1 (S10).

If both the left cost [cost(3)] and the right cost [cost(4)] are within the inside threshold range InS1, the image adjustment unit 21 may expand the initial 2D region in the second direction so that the cost adjacent to the inside threshold range InS1—either the left cost [cost(3)] or the right cost [cost(4)]—aligns with or is closest to the line defined by the inside threshold range InS1, and then store the expanded initial 2D region in the memory 22 (S11).

In this case, as with the front and rear, the length of the initial 2D region is adjusted to allow the 2D target coordinates to extend in the second direction. Accordingly, the initial 2D region may be expanded to the same size both leftward and rightward.

Additionally, a range of expansion in the second direction may also be adjusted so as not to exceed the left-to-right maximum distance HDmax1 of the maximum 2D region AR12 (see FIG. 3).

This may allow the initial 2D region to expand to a maximum size, nearly identical to the size of the display screen SC1.

As such, when it is determined whether to expand the initial 2D region in at least one of the first and second directions, the image adjustment unit 21 may generate an expansion-version 2D region using the initial 2D region, whose expansion state is determined in at least one direction, and store the expansion-version 2D region in the memory 22 (S12).

In steps S8 and S10, if at least one of the first cost and the second cost is less than or equal to the inside threshold or at least one of the third cost and the fourth cost is less than or equal to the inside threshold, the image adjustment unit 21 may proceed to step S12 to generate an expansion-version 2D region using the current initial 2D region and store the expansion-version 2D region in the memory 22 (S12).

By this operation, information of the generated expansion-version 2D region [e.g., a coordinate value of each pixel] may be stored in the memory 22 by the image adjustment unit 21.

In the present disclosure, the front cost [cost(1)] and the back cost [cost(2)] may be considered together, as well as the left cost [cost(3)] and right cost [cost(4)], to expand the initial 2D region in either the first or second direction.

However, in an alternative example, the initial 2D region may be expanded separately in the forward, backward, left, and right directions by individually considering the front cost [cost(1)], the back cost [cost(2)], the left cost [cost(3)], and the right cost [cost(4)].

At this point, the sizes of the areas expanding forward and backward may differ, as may the sizes of the areas expanding leftward and rightward.

For example, if the left cost [cost(3)] is within the inside threshold range InS1, the initial 2D region may be expanded leftward so that the left cost [cost(3)] aligns with or is closest to the line defined by the inside threshold range InS1. Similarly, if the front cost [cost(1)] is within the inside threshold range InS1, the initial 2D region may be expanded forward so that the front cost [cost(1)] aligns with or is closest to the line defined by the inside threshold range InS1.

As such, if the expansion of the initial 2D region and the direction of such expansion are determined by individually considering the front cost [cost(1)], back cost [cost(2)], left cost [cost(3)], and right cost [cost(4)], expanding the initial 2D region may be controlled more precisely.

Due to the above-described adjustment of an initial 2D region, an expansion-version 2D region may be generated, and a mesh may change to correspond to the expansion-version 2D region.

If the front cost [cost(1)], back cost [cost(2)], left cost [cost(3)], and right cost [cost(4)] are all out of the inside threshold range InS1, the expansion of the initial 2D region may not be performed. In this case, the initial 2D region and the expansion-version 2D region may be identical to each other.

Then, the image adjustment unit 21 may use the respective field-of-view deviation determination points P1 to P12 to determine whether any part of the virtual data is out of the field of view of a real camera attached to the vehicle 100. The virtual data may be virtual data having two-dimensional coordinates generated through conversion of the 3D target viewing coordinates [target_3*d*(1)~target_3*d*(4)] described earlier.

Each of the field-of-view deviation determination points P1 to P12 belongs to a shooting area of at least one real camera among multiple real cameras mounted on the front, rear, left, and right sides of the vehicle 100, but may be out of the field of view of the corresponding real camera. Here, the shooting area may be an area to be captured by the real camera.

In memory 22, among the four cameras mounted on the front, rear, left, and right sides of the vehicle, a real camera whose shooting range corresponds to the field-of-view deviation determination points P1 to P12 may be stored, corresponding to the field-of-view deviation determination points P1 to P12. As a result, the field-of-view deviation determination points P1 to P12 and the real cameras may be stored in the memory 22 to match each point with a camera corresponding thereto.

To this end, the image adjustment unit 21 may convert the coordinates of the field-of-view deviation determination points P1 to P12 stored in memory 22 into the camera coordinate system (i.e., the coordinate system of the real camera), and store the converted coordinates in the memory 22 (S13).

Next, the image adjustment unit 21 may use the coordinates converted into the camera coordinates to determine whether each of the field-of-view deviation determination points P1 to P12 is within the field of view of the real camera. That is, it may determine whether each of the field-of-view deviation determination points P1 to P12 is within a resolution range of a corresponding real camera (S14 to S18).

If any of the field-of-view deviation determination points P1 to P12 is out of the field of view of the real camera (S14), the image adjustment unit 21 may change a field-of-view off camera identification [fov_off(1)~fov_off(4)] of a real camera at the deviated point P1-P12 from an initial value (e.g., '0') to a set value (e.g., '1') (S16). The field-of-view off camera identifications [fov_off(1) to fov_off(4)] for the respective real cameras are already stored in the memory 22, and the initial value may be '0'.

The number of field-of-view off camera identification [fov_off(1) to fov_off(4)] may be the same as the number of real cameras attached to the vehicle 100. For example, there may be four field-of-view off camera identifications (e.g., a first field-of-view off camera identification to a fourth field-of-view off camera identification) [fov_off(1) to fov_off(4)], with a first field-of-view off camera identification [fov_off (1)] corresponding to a first real camera (i.e., the front real camera), a second field-of-view off camera identification [fov_off(2)] corresponding to a second real camera (i.e., the rear real camera), a third field-of-view off camera identification [fov_off(3)] corresponding to the third real camera (i.e., the left real camera), and a fourth field-of-view off camera identification [fov_off(4)] corresponding to a fourth real camera (i.e., the right real camera).

At this point, the value of the field-of-view off camera identification [fov_off(1)~fov_off(4)] of a real camera at any one of the field-of-view deviation determination points P1 to P12 within the field of view may retain a previous value (e.g., the initial value) (S15).

Therefore, a real camera with the field-of-view off camera identification [fov_off(1)~fov_off(4)] having a set value may be a camera in which at least one of the respective points P1 to P12 within a shooting range is out of the field of view of the camera. For example, such a real camera may be a field-of-view off camera.

Accordingly, the image adjustment unit 21 may identify which real camera attached to the vehicle 100 is a field-of-view off camera having an field-of-view deviation determination point P1 or P12 out of the field of view, based on the values of the field-of-view off camera identification [fov_off (1) to fov_off(4)] corresponding to the respective real cameras.

Next, based on the costs [cost(1)~cost(4)] for the 2D target viewing coordinates [target_2*d*(1)~target_2*d*(4)] and the field-of-view off camera identifications [fov_off(1) to fov_off(4)] corresponding to the real cameras, the image adjustment unit 21 may determine whether each of the 2D target viewing coordinates [target_2*d*(1)~target_2*d*(4)] is positioned within a shooting range of a corresponding real camera.

Accordingly, the image adjustment unit 21 may determine the suitability of the target viewing information for each real camera by determining the costs [cost(1)~cost(4)] for the 2D target viewing coordinates [target_2*d*(1)~target_2*d*(4)] and the corresponding field-of-view off camera identifications [fov_off(1) to fov_off(4)].

If a field-of-view off camera identification [fov_off(1) ~fov_off(4)] for a corresponding real camera has a set value, a pixel [i.e., point P1 to P12] may be positioned out of the camera's field of view.

In this case, on the image output device of the vehicle 100, the point (e.g., P9) out of the field of view is positioned outside the shooting range of the corresponding real camera, so the point must be moved into the camera's field of view. Therefore, in the present disclosure, the gradient of the mesh to which the expansion-version 2D region generated in step S12 is applied is decreased so that even an area out of the field of view, including the aforementioned point, may be brought within the field of view of the real camera.

In addition, the cost for the 2D target viewing coordinate [target_2*d*(1)~target_2*d*(4)] related to the corresponding real camera may be equal to or less than the outside threshold, and the corresponding 2D target viewing coordinate [target_2*d*(1)~target_2*d*(4)] may be out of the outside threshold range OutS1. In this condition, the gradient of the mesh needs to be increased to move the 2D target viewing coordinates [target_2*d*(1)~target_2*d*(4)] into the display screen SC1.

Accordingly, if the image adjustment unit 21 needs to adjust the gradient of the mesh in opposite directions (to decrease and increase the gradient), the corresponding target viewing information may be unachievable target viewing information that cannot be achieved even by adjusting the gradient of the mesh.

In this way, if the target viewing information is determined to be unachievable, the image adjustment unit 21 may determine the target viewing information as unachievable and modify the target viewing information by an adjustment value to generate new target viewing information. Then, the image adjustment unit 21 may re-determine the suitability of the new target viewing information.

Thus, after step S14 to S18, in order to determine whether the target viewing information is unachievable, the image adjustment unit 21 may first determine whether the cost [cost(1)] of the first (e.g., i-th of k) 2D target viewing coordinate [target_2D(1)] is less than the inside threshold (S19).

When the cost [cost(1)] of the first 2D target viewing coordinate [target_2D(1)] (i.e., the first cost) is less than the inside threshold (S19), the image adjustment unit 21 may determine that the first 2D target viewing coordinate [target_2D(1)] is positioned out of the inside threshold range InS1 and that the gradient of the corresponding mesh (i.e., the mesh to which the expansion-version 2D region is applied) is unable to be decreased.

Accordingly, if the cost [cost(1)] of the first 2D target viewing coordinate [target_2D(1)] (i.e., the first cost) is less than the inside threshold (S19), the image adjustment unit 21 may determine whether the first field-of-view off camera identification [fov_off(1)], which is the field-of-view off camera identification of the first camera (e.g., the front camera), has a set value (e.g., '1') (S20).

If the value of the field-of-view off camera identification [fov_off(1)] of the first camera (e.g., the front camera) has a set value, the image adjustment unit 21 may determine the first target viewing information as unachievable.

Thus, since the first target viewing information is unachievable, the image adjustment unit 21 may adjust at least one of the first target viewing distance and the first target viewing height, along with the first target viewing information, (S21) and then proceed to step S4 to determine the suitability of newly adjusted first target viewing information.

At this point, the target viewing distance and target viewing height may each be reduced by respective predetermined amounts (e.g., adjustment amounts). The adjustment amounts for the target viewing distance and the target viewing height may be equal or different.

Through the operation of the image adjustment unit 21, if the i-th field-of-view off camera identification among k field-of-view off camera identifications has a set value and an i-th cost among k costs is equal to or less than an inside threshold, at least one of an i-th target viewing distance and an i-th target viewing height may be reduced by an adjustment amount, thereby generating a new i-th target viewing distance and a new i-th target viewing height.

In the present disclosure, if the first target viewing height for the current target viewing information is greater than a set size, the image adjustment unit 21 may reduce the target viewing height by the adjustment amount to set a new first target viewing distance, and then proceeds to step S4 to determine whether the newly adjusted first target viewing information is unachievable.

However, if the first target viewing height is less than or equal to the set size, the image adjustment unit 21 may not further reduce the first target viewing height, but may reduce the first target viewing distance out of the first target viewing information by the adjustment amount to set a new first target viewing distance, and then proceed to step S4.

In this way, if the target viewing information is unachievable, the image adjustment unit 21 may sequentially adjust at least one of the target viewing distance and the target viewing height so that the target viewing information becomes achievable, rather than unachievable.

The operation of adjusting the target viewing information by determining whether the target viewing information is unachievable may be performed sequentially from the first target viewing information to the fourth target viewing information, which is the last target viewing information (S22-S23).

However, if the value of the first field-of-view off camera identification [fov_off(1)] is not '1' in step S19, or if the cost [cost(1)] of the first 2D target viewing coordinate [target_**2*d*(1)] exceeds the inside threshold in step S20, i.e., if the first target viewing information is achievable, the image adjustment unit 21 may increase or decrease the gradient of the corresponding mesh (i.e., the mesh of the minimum 2D region) based on the minimum cost stored in memory 22, so that the 2D target viewing coordinate corresponding to the minimum cost is adjusted to fall between the outside threshold range OutS1 and the inside threshold range InS1**.

Accordingly, the image adjustment unit 21 may determine whether the minimum cost is greater than the inside threshold. That is, it may determine whether all the 2D target viewing coordinates [target_2D(1)~target_**2*d*(4)] are positioned within the inside threshold range InS1 (S24**).

If the minimum cost is greater than the inside threshold (S24), the image adjustment unit 21 may decrease the gradient of the mesh (S25). As the gradient of the mesh is reduced, the 2D region displayed on the display screen SC1 may be expanded further toward the edges of the display screen SC1. In this case, the gradient may be decreased by a set value, and the set value may be determined based on a size of the cost.

However, on the other hand, if the minimum cost is not greater than the inside threshold (S24), the image adjustment unit 21 may determine whether the minimum cost is less than the outside threshold, that is, whether at least one of all the 2D target viewing coordinates [target_2D(1)~target_**2*d*(4)] is positioned out of the outside threshold range OutS1 (S26**).

Therefore, if the minimum cost is less than the outside threshold (S26), the image adjustment unit 21 may increase the gradient of the mesh (S27). As the gradient of the mesh is increased, the 2D target viewing coordinates displayed on the display screen SC1 may move inward on the display screen SC1. In this case, the increase in the gradient may also be preset or may be determined based on a cost.

In the operation of the image adjustment unit 21, in a case where the minimum cost has a value between the inside threshold and the outside threshold, if each 2D target viewing coordinate is positioned within the inside threshold range InS1, a 2D region may be expanded to align with or be closest to the line defined by the inside threshold range InS1 by the operations of step S8 to step S11. Thus, all the 2D target viewing coordinates [target_2D(1)~target_**2*d*(4)] are positioned between the inside threshold range InS1 and the outside threshold range OutS1, and in this case, it may be determined that first and second target viewing information are secured, so the operation of the image adjustment unit 21 may be terminated (S100**).

If the 2D target viewing coordinates cannot be moved to align with or be closest to the line defined by the inside threshold range InS1 due to limitations in the maximum 2D region in steps S8 to S11, the gradient of the mesh must be reduced to move the 2D target viewing coordinates outward. However, since the minimum cost is between the inside and outside thresholds, the gradient of the mesh cannot be decreased any further, so the operation may end in this state.

Since the 2D region reaches within the minimum 2D region in the direction of a 2D target viewing coordinate having the minimum cost, the image adjustment unit 21 cannot reduce the 2D region any further. Therefore, the image adjustment unit 21 cannot use a method of reducing a 2D region in a direction of a 2D target viewing coordinate with a minimum cost and decreasing a gradient of a mesh. Therefore, if the minimum cost is between the inside threshold and the outer threshold, and if some costs are within than the inside threshold range, that is, if some 2D target viewing coordinates fall within the inside threshold range InS1, the 2D region can no longer be adjusted, so the image adjustment unit 21 may terminate the operation. The fact that a 2D target viewing coordinate are within the inside threshold range InS1 may indicate that a viewing distance and height greater than the target viewing distance and height have been secured.

Therefore, after adjusting the gradient for the current corresponding mesh in steps S25 and S27, the image adjustment unit 21 may proceed to step S4 to continue the control operation so that the position corresponding to the target viewing information for the front, rear, left, and right sides is positioned between the inside threshold range InS1 and the outside threshold range OutS1.

In a case where the operation of determining an unachievable target field-of-view distance for each of the first to fourth target viewing distances is completed, if any achievable target field-of-view information exists among the first to fourth target field-of-view information, the image adjustment unit 21 may adjust the gradient of the corresponding mesh based on a comparison between the minimum cost value and the inside or outside threshold, thereby adjusting at least one of a target viewing distance and a target viewing height for the achievable target field-of-view information.

For example, if identification of a corresponding camera (e.g., the front camera) does not have a set value, i.e., an initial value (e.g., '0'), in step S20, the image adjustment unit 21 may determine whether a minimum cost stored in the memory 22 is greater than or equal to the inside threshold, i.e., whether a plurality of target viewing distances (the first to fourth target viewing distances) all are within the inside threshold range InS1.

Thus, if the identification of the corresponding camera (e.g., the front camera) remains at its initial value and all target viewing distances are within the inside threshold range InS1, the image adjustment unit 21 may decrease the gradient of the corresponding mesh (S25). Due to the decrease in the gradient of the mesh, the 2D target viewing coordinates [target_2*d*(1)~target_2*d*(4)] displayed on the display screen SC1 may be further moved toward the edges of the display screen SC1. In this case, the decrease in the gradient may also be preset or may be determined based on a cost.

However, the image adjustment unit 21 may determine in step 26 whether the minimum cost is less than the outside threshold, that is, whether a target viewing distance deviating the most from the display screen among a plurality of target viewing distances (the first to fourth target viewing distances) deviates by more than a set size, the image adjustment unit 21 may increase the gradient of the corresponding mesh (S27).

The decrease or increase in the gradient of the mesh may occur incrementally by a specified amount.

The adjustment of the mesh may be performed until the minimum cost falls between the inside and outside thresholds.

However, if the minimum cost is greater than or equal to the outside threshold in step S26, the image adjustment unit 21 determines that all the target viewing distances are secured and that an image within all the target viewing distances can be displayed on the display screen. Thus, the image adjustment unit 21 may terminate the operation of adjusting a display status of the display screen to correspond to the target viewing distances (S100).

Through the operation of the system for adjusting a surround view image according to the present disclosure, an image may be output to an image output device attached to the a vehicle 100 in a manner in which a subject within the range of each target viewing distance and each target viewing height is positioned within the display screen of the image output device.

Figure 14:
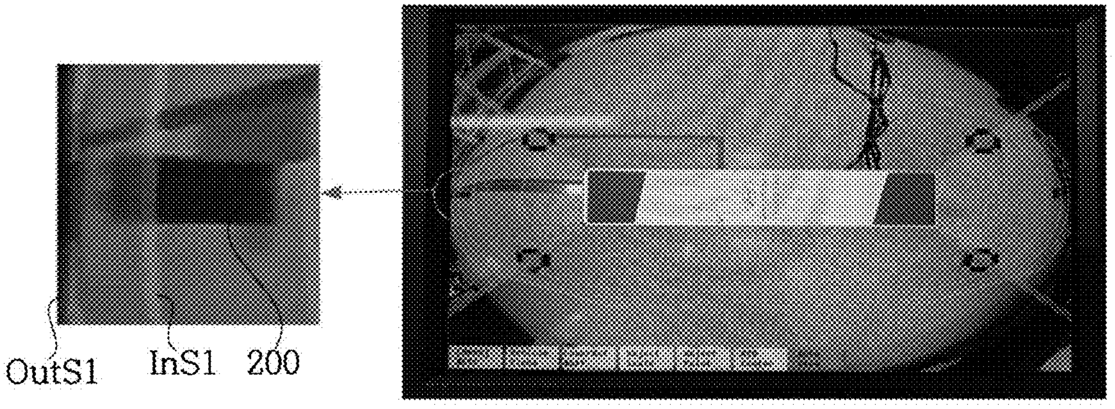
FIG. 14 is an example of a screen showing a case where a subject at a first target viewing distance and a first target viewing height is positioned within a display screen in accordance with an operation of a system for adjusting a surround view image according to one embodiment of the present disclosure.

Referring to FIG. 14, it may be seen that the end of a subject 200 having a first target viewing distance and a first target viewing height is positioned between the outside threshold range OutS1 and the inside threshold range InS1.

Due to these features, since the adjustment of a surround view image is automatically performed according to desired conditions, saving significant time and improving the consistency of the quality of the adjusted and output surround view image.

In addition, the surround view image may be easily, quickly, and accurately adjusted to the driver's desired field of view, improving driver satisfaction and convenience.

The technical features disclosed in each embodiment of the present disclosure are not limited to a corresponding embodiment, and unless incompatible with each other, the technical features disclosed in each embodiment may be applied in combination to other embodiments.

Therefore, although each embodiment is described mainly about an individual technical feature, the technical features of the embodiments of the present disclosure may be applied in combination, unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims, and equivalents thereof.

What is claimed is:

1. An apparatus for adjusting a surround view image, comprising:

a storage unit configured to store a 2D region, k target viewing distances, k target viewing heights, and r field-of-view deviation determination points; and an image adjustment unit connected to the storage unit and configured to:

generate k 3D target viewing coordinates by performing 3D coordinate conversion using the k target viewing distances and the k target viewing heights, respectively;

derive k costs by calculating costs for the respective 3D target viewing coordinates;

based on the values of the k costs produced, expanding the 2D region in at least one of a first direction and a second direction;

determine whether each field-of-view deviation determination point positioned within a field of view of a real camera, and change a field-of-view off camera identification corresponding to any field-of-view deviation determination point out of the field of view among k field-of-view off camera identifications to a set value;

when an i-th field-of-view off camera identification among k field-of-view off camera identifications has a set value and an i-th cost among k costs is equal to or less than an inside threshold, generate a new i-th target viewing distance and a new i-th target viewing height by reducing at least one of an i-th target viewing distance and an i-th target viewing height by an adjustment amount.

2. The apparatus of claim 1, wherein:

the 2D region comprises a minimum 2D region and a maximum 2D region, and the image adjustment unit expands the minimum 2D region in at least one of the first direction and the second direction.

3. The apparatus of claim 2, wherein a range of expansion of the minimum 2D region is not greater than the maximum 2D region.

4. The apparatus of claim 1, wherein:

the image adjustment unit converts the respective 3D target viewing coordinates into k 2D target viewing coordinates, and the cost is a length of a 2D target viewing coordinate inward or outward from an edge of a display screen.

5. The apparatus of claim 1, wherein:

when a value of at least one cost related to the first direction among the k costs is all greater than the inside threshold, the 2D region is expanded in the first direction so that a cost having a smaller value among the costs related to the first direction aligns with or is closest to a line defined by the inside threshold range, the line defined inward of the display screen, when a value of at least one cost related to the second direction among the k costs is all greater than the inside threshold, the 2D region is expanded in the second direction so that a cost having a smaller value among the costs related to the second direction aligns with or is closest to a line defined by the inside threshold range, the line defined inward of the display screen, and the inside threshold is a cost of the inside threshold range.

6. The apparatus of claim 1, wherein when the i-th target viewing height is greater than a set amount, the image adjustment unit reduces the i-th target viewing height by an adjustment amount, and when the i-th target viewing height is less than or equal to the set amount, the image adjustment unit reduces the i-th target viewing distance by an adjustment amount.

7. The apparatus of claim 6, wherein the adjustment amount for adjusting the i-th target viewing height and the adjustment amount for adjusting the i-th target viewing length are equal or different.

8. The apparatus of claim 1, wherein the r field-of-view deviation determination points comprises four corners of the display screen, centers of sides of the display screen, and points where the straight line of a first direction and the straight line of a second direction, displayed on the display screen, meet the sides of the display screen.

9. The apparatus of claim 1, wherein the image adjustment unit derives a minimum cost having a smallest value among the k costs, and when the i-th field-of-view off camera identification does not have a set value while the i-th cost exceeds an inside threshold, the image adjustment unit increases or decreases a gradient of a mesh to which a 2D region extended in at least one of the first direction and the second direction is applied, using the minimum cost.

10. The apparatus of claim 9, wherein, when the minimum cost is greater than the inside threshold, the image adjustment unit decreases the gradient of the mesh.

11. The apparatus of claim 10, wherein, when the minimum cost is not greater than the inside threshold and less than an outside threshold, the image adjustment unit increases the gradient of the mesh.

12. The apparatus of claim 11, wherein:

the outside threshold is a cost of an outside threshold range, and the outside threshold range is a range surrounded by edges of the display screen.

* * * * *